April 14, 1925.

A. RUBIN 1,533,613

VARIOMETER CONNECTER

Filed Sept. 22, 1922

INVENTOR.
Abraham Rubin
BY
Gifford, Bull & Scull
ATTORNEYS

Patented Apr. 14, 1925.

1,533,613

UNITED STATES PATENT OFFICE.

ABRAHAM RUBIN, OF NEW YORK, N. Y., ASSIGNOR TO HENRY HYMAN & CO., INC., OF NEW YORK, N. Y., A CORPORATION OF NEW YORK.

VARIOMETER CONNECTER.

Application filed September 22, 1922. Serial No. 589,774.

*To all whom it may concern:*

Be it known that I, ABRAHAM RUBIN, a citizen of the United States, residing at New York city, in the county and State of New York, have invented certain new and useful Improvements in Variometer Connecters, of which the following is a specification.

My present invention relates to improvements in variometers or other similar devices in which it is desirable to have a definite and fixed electric connection between a bearing and a rotatable shaft extending through the bearing.

Figure 1:
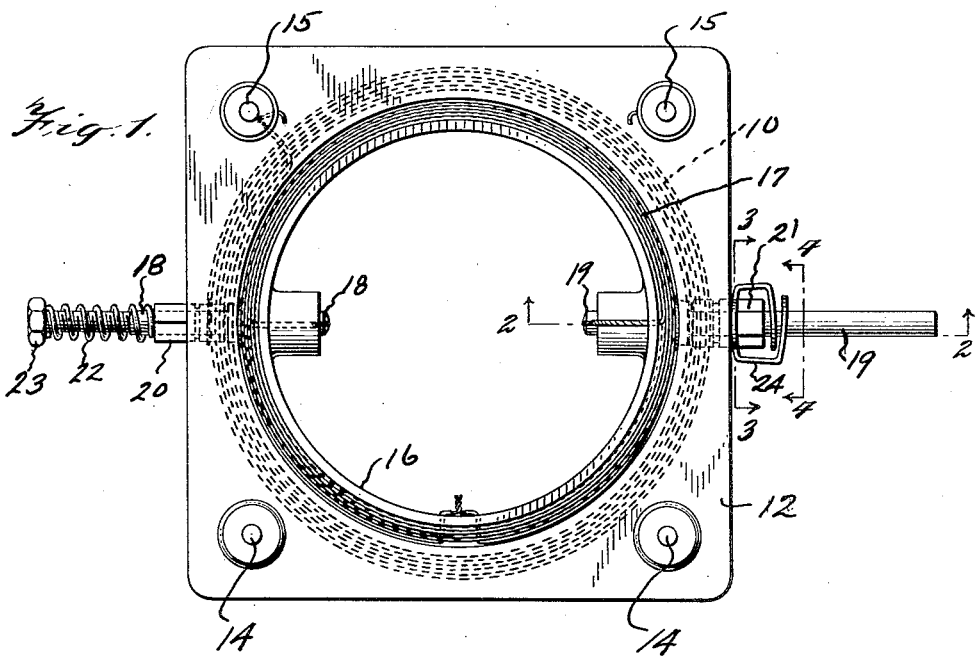
Figure 3:
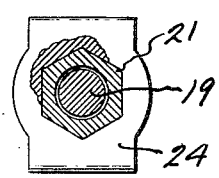
Figure 2:
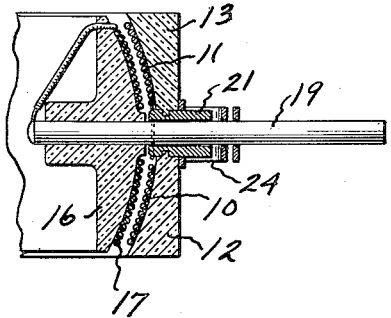
Figure 4:
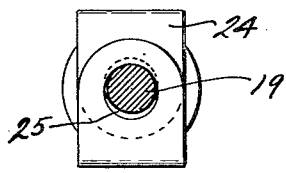

My invention will be best understood from the following description and the annexed drawing, in which Fig. 1 is a front elevation of one form of variometer which I have chosen for purposes of illustration and having my invention embodied therein; Fig. 2 is a section on the line 2—2 of Fig. 1; Fig. 3 is an enlarged section on the line 3—3 of Fig. 1, and Fig. 4 is an enlarged section on the line 4—4 of Fig. 1.

Like reference characters indicate like parts in the several views.

For purposes of illustration I have shown a variometer of a well-known type, in which a stator winding is divided into two parts with a rotor winding connected between the two parts in series, the rotor winding being arranged as is usual so that it may be set at any desired angle with the plane of the stator winding. The two sections of the stator winding 10 and 11 are mounted respectively in the two halves of a casing 12 and 13, respectively, these two halves of the casing being connected by the screws 14, 14 and 15, 15, these latter serving also as binding posts. As shown, the casing is made internally as a portion of a sphere, with the windings 10 and 11 on the interior thereof. Within the interior of the casing is mounted a rotor frame 16, this frame having a spherical exterior surface with a winding 17 thereon. The rotor frame 16 is provided at either side with short shafts 18 and 19 passing through bearings carried in the stator frame, these bearings, in the form illustrated, comprising loose members 20 and 21 having hexagonal exteriors engaging with correspondingly shaped openings in the stator frame to prevent the bearings from rotating. One terminal of the winding 17 is connected to the inner end of the shaft 19 and the other end of the winding is connected to the inner end of the shaft 18. The stator windings 10 and 11 are connected respectively to one of the terminals 15 and are also connected respectively to one of the bearings 20, 21. A spring 22 abutting against a nut 23 presses against the bearing 20 and provides sufficient friction to hold the stator in adjusted position, and also serves to provide a good electric contact between the bearing 20 and the shaft 18 and correspondingly a good connection between one of the stator windings and the rotor winding.

The device so far described is old in the art and further detail description thereof will be unnecessary.

As such devices have heretofore been made, the contact between the shaft 19 and the bearing 21 has been relied upon for a connection between one of the stator windings and the rotor winding. It has been found, however, that, because of the looseness of this connection, the device, particularly when used in wireless receiving as is usual, has no dependable electric connection between the shaft and the bearing or one which is constant for any adjustment of the rotor, and it is one of the objects of my invention to overcome this difficulty.

In the illustrative embodiment, I have provided a connecter 24 which engages the bearing 21 externally and is held yieldingly in contact with the shaft 19, so that no matter how this shaft 19 may be moved, there will be a definite and fixed electric connection between the shaft and the bearing. In the illustrative form, this connecter is a sheet-metal piece having an hexagonal opening therein to fit tightly around the exterior of the bearing 21 and having a pair of arms extending toward and surrounding the shaft, each arm being provided with a hole 25 somewhat larger than the shaft 19 and through which the shaft passes. There is sufficient spring in the arms of the connecter 24 to press the edges of the openings 25 against the periphery of the shaft 19, so that there is a definite and fixed electric connection between this shaft and the bearing 21 through the connecter 24. By providing a pair of arms, a more certain connection is insured, although it will be understood that only one arm would be sufficient for some purposes.

The specific embodiment of my invention shown in the drawing is obviously a cheap one and one which may be easily connected to the variometer after the latter is assembled, it being necessary merely to pass the connecter 21 over the end of the shaft 19 and force it over the polygonal exterior of the bearing 21.

It will be understood that the arrangement which I have shown is merely illustrative and its embodiment may be widely varied.

I claim:

1. In a variometer, a casing having a stator winding therein, a pair of shaft bearings in said casing, a shaft extending through each of said bearings, a rotor on said shafts having its winding connected thereto, said stator winding being connected to each one of said bearings, a coiled spring surrounding one of said shafts between the bearing for said shaft and a projection on the shaft, and arranged to move the rotor axially to provide frictional engagement with the shaft to hold the rotor in adjusted position and to provide an electrical connection between the shaft and the bearing, and a connecter between the other shaft and its bearing arranged to maintain electrical connection therebetween as the shaft is rotated, said connecter exerting only lateral pressure on said shaft and being arranged to permit movement of the shaft axially.

2. In a variometer, a casing having a stator winding therein, a pair of shaft bearings in said casing, a shaft extending through each of said bearings, a rotor on said shafts having its winding connected thereto, said stator winding being connected to each one of said bearings, a coiled spring surrounding one of said shafts between the bearing for said shaft and a projection on the shaft, and arranged to move the rotor axially to provide frictional engagement with the shaft to hold the rotor in adjusted position and to provide an electrical connection between the shaft and the bearing, and a connecter between the other shaft and its bearing arranged to maintain electrical connection therebetween as the shaft is rotated, said connecter comprising a flat spring attached to one of said parts and pressing yieldingly laterally only against the other part and arranged to permit movement of the shaft axially.

3. The combination in an apparatus of the class described of a fixed element, bearings, shafts in said bearings, a movable element mounted on said shafts so as to be capable of rotation with respect to said fixed element, and means to make an electrical connection to said movable element comprising a flat spring attached to one of said bearings and having an opening through which a shaft extends, said spring being arranged to press the edge of the opening laterally against the shaft.

4. The combination in an apparatus of the class described of a fixed element, bearings, shafts in said bearings, a movable element mounted on said shafts so as to be capable of rotation with respect to said fixed element, one of said bearings having a non-circular exterior portion, and means to make an electrical connection to said movable element comprising a flat spring having an opening fitting said non-circular portion and an opening through which a shaft passes, said spring being arranged to press the edge of the shaft opening laterally against the shaft.

5. The combination in an apparatus of the class described of a fixed element, bearings, shafts in said bearings, a movable element mounted on said shafts so as to be capable of rotation with respect to said fixed element, one of said bearings having a non-circular exterior portion, means to make an electrical connection to said movable element comprising a flat spring having an opening fitting said non-circular portion and a pair of arms extending in opposite directions from said bearing, each arm having an opening through which a shaft extends, and said arms being arranged to press the edges of the shaft openings laterally against the shaft.

ABRAHAM RUBIN.